(12) United States Patent
Tumbleston et al.

(10) Patent No.: US 11,982,991 B2
(45) Date of Patent: May 14, 2024

(54) SYSTEMS AND APPARATUSES FOR ADDITIVE MANUFACTURING WITH PROCESS UPDATE AND LOCK DOWN

(71) Applicant: Carbon, Inc., Redwood City, CA (US)

(72) Inventors: John R. Tumbleston, Menlo Park, CA (US); Kyle Laaker, Redwood City, CA (US); Ronald A. Truong, San Mateo, CA (US); Roy Goldman, Cupertino, CA (US); Abhishek Parmar, Palo Alto, CA (US)

(73) Assignee: Carbon, Inc., Redwood City, CA (US)

( * ) Notice: Subject to any disclaimer, the term of this patent is extended or adjusted under 35 U.S.C. 154(b) by 468 days.

(21) Appl. No.: 17/421,199

(22) PCT Filed: Dec. 13, 2019

(86) PCT No.: PCT/US2019/066213
§ 371 (c)(1),
(2) Date: Jul. 7, 2021

(87) PCT Pub. No.: WO2020/146092
PCT Pub. Date: Jul. 16, 2020

(65) Prior Publication Data
US 2022/0057776 A1    Feb. 24, 2022

Related U.S. Application Data

(60) Provisional application No. 62/833,921, filed on Apr. 15, 2019, provisional application No. 62/790,046, filed on Jan. 9, 2019.

(51) Int. Cl.
*G05B 19/4099*    (2006.01)
*B29C 64/393*    (2017.01)
(Continued)

(52) U.S. Cl.
CPC ........ *G05B 19/4099* (2013.01); *B29C 64/393* (2017.08); *B33Y 30/00* (2014.12); *B33Y 50/02* (2014.12); *G05B 2219/49023* (2013.01)

(58) Field of Classification Search
CPC .... G05B 19/4099; B33Y 30/00; B33Y 50/02; B29C 64/393
See application file for complete search history.

(56) References Cited

U.S. PATENT DOCUMENTS

| 5,236,637 A | 8/1993 | Hull |
| 5,391,072 A | 2/1995 | Lawton et al. |

(Continued)

FOREIGN PATENT DOCUMENTS

| WO | 2015164234 A1 | 10/2015 |
| WO | 2015195924 A1 | 12/2015 |

(Continued)

OTHER PUBLICATIONS

International Search Report and Written Opinion corresponding to PCT/US2019/066213; dated Mar. 27, 2020 (16 pages).

(Continued)

*Primary Examiner* — Mark A Connolly
(74) *Attorney, Agent, or Firm* — Myers Bigel, P.A.

(57) ABSTRACT

An additive manufacturing system may include an additive manufacturing apparatus on which a process of producing a three-dimensional object from a material can be performed; an additive manufacturing process controller operatively associated with the additive manufacturing apparatus; and a first memory device operatively associated with the additive manufacturing process controller. The first memory device may include first and second stable release process programs each comprising a first subset of operations executable by said process controller. The system may include a second memory device comprising another stable release process (Continued)

program comprising a second subset of operations executable by said process controller. The system may include a selector configured to choose one of the stable release process programs to run on said process controller when producing a three-dimensional object on the additive manufacturing apparatus.

20 Claims, 4 Drawing Sheets

(51) Int. Cl.
    *B33Y 30/00*          (2015.01)
    *B33Y 50/02*          (2015.01)

(56) References Cited

U.S. PATENT DOCUMENTS

| | | | |
|---|---|---|---|
| 5,529,473 | A | 6/1996 | Lawton et al. |
| 7,438,846 | B2 | 10/2008 | John |
| 7,892,474 | B2 | 2/2011 | Shkolnik et al. |
| 8,110,135 | B2 | 2/2012 | El-Siblani |
| 8,120,468 | B2 | 2/2012 | Kangas |
| 8,526,910 | B2 | 9/2013 | Messerly |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,360,757 | B2 | 6/2016 | Desimone et al. |
| 9,373,201 | B2 | 6/2016 | Jefferies et al. |
| 9,453,142 | B2 | 9/2016 | Rolland et al. |
| 9,498,920 | B2 | 11/2016 | Desimone et al. |
| 9,562,429 | B2 | 2/2017 | Walton et al. |
| 9,576,476 | B2 | 2/2017 | Yang |
| 9,587,487 | B2 | 3/2017 | Walton et al. |
| 9,589,428 | B2 | 3/2017 | Edwards et al. |
| 9,595,058 | B2 | 3/2017 | Khalid |
| 9,598,606 | B2 | 3/2017 | Rolland et al. |
| 9,676,963 | B2 | 6/2017 | Rolland et al. |
| 10,259,171 | B2 | 4/2019 | Robeson et al. |
| 10,434,706 | B2 | 10/2019 | Robeson et al. |
| 2013/0292862 | A1 | 11/2013 | Joyce |
| 2013/0295212 | A1 | 11/2013 | Chen et al. |
| 2015/0331402 | A1 | 11/2015 | Lin et al. |
| 2015/0360419 | A1 | 12/2015 | Willis et al. |
| 2016/0046075 | A1 | 2/2016 | Desimone et al. |
| 2016/0193786 | A1 | 7/2016 | Moore et al. |
| 2016/0200052 | A1 | 7/2016 | Moore et al. |
| 2016/0229123 | A1 | 8/2016 | Carlson et al. |
| 2016/0263837 | A1 | 9/2016 | Goldman et al. |
| 2016/0263838 | A1 | 9/2016 | Goldman et al. |
| 2016/0288376 | A1 | 10/2016 | Sun et al. |
| 2017/0129167 | A1 | 5/2017 | Castanon |
| 2017/0129169 | A1 | 5/2017 | Batchelder et al. |
| 2017/0243016 | A1 | 8/2017 | Hayashi |
| 2018/0022034 | A1 | 1/2018 | Sutter et al. |
| 2018/0126630 | A1 | 5/2018 | Panzer et al. |
| 2018/0243976 | A1 | 8/2018 | Feller |
| 2018/0290374 | A1 | 10/2018 | Willis et al. |
| 2018/0302524 | A1 | 10/2018 | Corr et al. |
| 2019/0160733 | A1 | 5/2019 | Mirkin et al. |
| 2021/0278824 | A1* | 9/2021 | Kawai ................... B33Y 50/02 |

FOREIGN PATENT DOCUMENTS

| | | |
|---|---|---|
| WO | 2016007495 A1 | 1/2016 |
| WO | 2016123499 A1 | 8/2016 |
| WO | 2016123506 A1 | 8/2016 |
| WO | 2016140886 A1 | 9/2016 |
| WO | 2016149014 A1 | 9/2016 |
| WO | 2016149097 A1 | 9/2016 |
| WO | 2016172783 A1 | 11/2016 |
| WO | 2016172788 A1 | 11/2016 |
| WO | 2016172804 A1 | 11/2016 |
| WO | 2016172805 A1 | 11/2016 |
| WO | 2017210298 A1 | 12/2017 |
| WO | 2018169826 A1 | 9/2018 |
| WO | 2018237038 A1 | 12/2018 |

OTHER PUBLICATIONS

Janusziewicz, Rima, et al., "Layerless fabrication with continuous liquid interface production", PNAS, 113, 2016, 11703-11708.
Tumbleston, John R., et al., "Continuous liquid interface production of 3D Objects", Science, 347(6228), 2015, 1349-1352.

* cited by examiner

SYSTEMS AND APPARATUSES FOR ADDITIVE MANUFACTURING WITH PROCESS UPDATE AND LOCK DOWN

CROSS REFERENCE TO RELATED APPLICATIONS

This application is a 35 U.S.C. § 371 national phase application of International Application Serial No. PCT/US2019/066213, filed Dec. 13, 2019, which claims priority to U.S. Provisional Application Ser. No. 62/790,046, filed Jan. 9, 2019, and to U.S. Provisional Application Ser. No. 62/833,921, filed Apr. 15, 2019, the disclosures of which are hereby incorporated by reference in their entireties.

FIELD OF THE INVENTION

The present invention concerns additive manufacturing, and particularly concerns systems and apparatus in which the process control is updatable.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of more rapid stereolithography techniques sometimes referred to as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606). This has in turn lead to the development of more advanced systems and controls for such methods and apparatus. See, for example, Sutter, Gutierrez, Shirvanyants, Moore, and Tumbleston, *Fabrication of three dimensional objects with multiple operating modes*, US Patent Application Pub. No. US2018/0022034 (Jan. 25, 2018), Goldman, Carlson, and Parmar, *Methods, systems, and computer program products for determining orientation and fabrication parameters used in three-dimensional (3D) continuous liquid interface printing (CLIP) systems, and related printers*, US Patent Application Pub. No. US 2016/0263838 (Sep. 15, 2016); Goldman, Carlson, and Parmar, *Methods, systems, and computer program products for determining fabrication parameters used in three-dimensional (3D) continuous liquid interface printing (CLIP) systems, and related printers*, US Patent Application Pub. No. US 2016/0263837 (Sep. 15, 2016); and Carlson and Parmar, *Remote three-dimensional continuous liquid interface production (CLIP) systems, related printers, and methods of operating the same* US Patent Application Pub. No. US 2016/0229123 (Aug. 11, 2016).

Carbon Inc. has implemented the periodic update of their process control software that operates their apparatus, over the Internet. This significantly enhances the attractiveness of additive manufacturing by providing the end user with systems and apparatuses that improve over time.

SUMMARY OF THE INVENTION

While the ability to update process control software on additive manufacturing apparatuses via the Internet has been an important contribution to the additive manufacturing field, it has proven pglematic to some end users implementing additive manufacturing for actual production of commercial products (particularly with more advanced dual cure resins). This had not been a problem when additive manufacturing was primarily used for prototyping.

Accordingly, the present invention provides the end user with additive manufacturing systems, apparatus, and methods in which the user has the ability to choose between either a prior, stable, operating software version, or one or more updated operating software versions.

In some embodiments, each version of the operating software configures the process controller to modify the production process for each object (or group of objects) being produced, based on specific object data for the object(s) being produced, specific material data for the material from which the object is produced, and/or specific hardware data for the apparatus on which the object is produce.

For example, the present invention provides, in some embodiments, an additive manufacturing system, including: (a) at least one additive manufacturing apparatus (e.g., a stereolithography apparatus) on which a process of producing a three-dimensional object from a material can be performed; (b) an additive manufacturing process controller operatively associated with each the at least one additive manufacturing apparatus; (c) a memory device operatively associated with the additive manufacturing process controller, wherein the memory device rises non-transitory instructions that are executable by the associated additive manufacturing process controller, the memory device comprising: (d1) a first stable release process program executable by the process controller; (d2) a second stable release process program executable by the process controller; and (d3) optionally, a third stable release process program executable by the process controller; the additive manufacturing system further comprising: (e) a selector operatively associated with the process controller, wherein the selector is configured to choose one of the first, second, or optional third stable release process programs to run on the process controller and produce a three-dimensional object on each at least one additive manufacturing apparatus.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Figure 2:
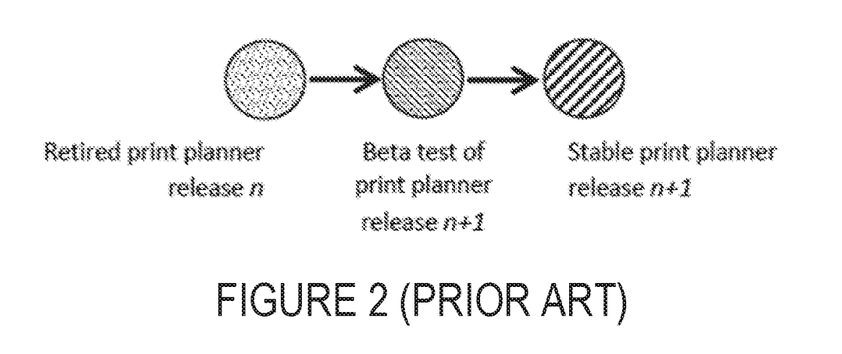
FIG. 2 schematically illustrates a prior art process control update protocol, in which prior versions of process control software is updated and replaced through optional beta test versions to a subsequent, improved, version of the process control software.
Figure 3:
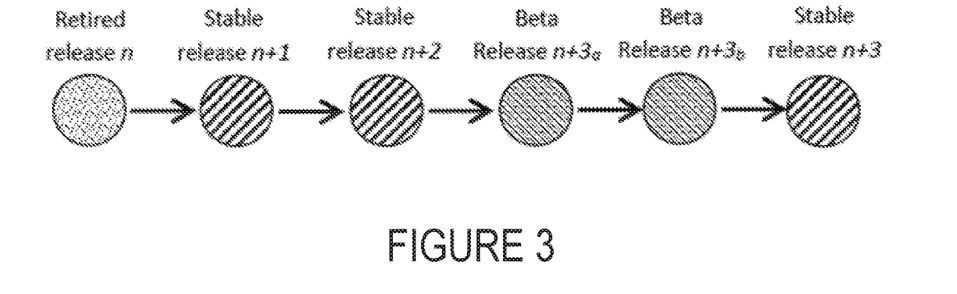
FIG. 3 schematically illustrates a first embodiment of the present invention, in which prior versions of the process control software is updated as in FIG. 2, but the system and apparatus also allows the apparatus operator to choose between a prior stable version and a subsequent stable version of the process control software for carrying out the production of a particular three-dimensional object.
Figure 4:
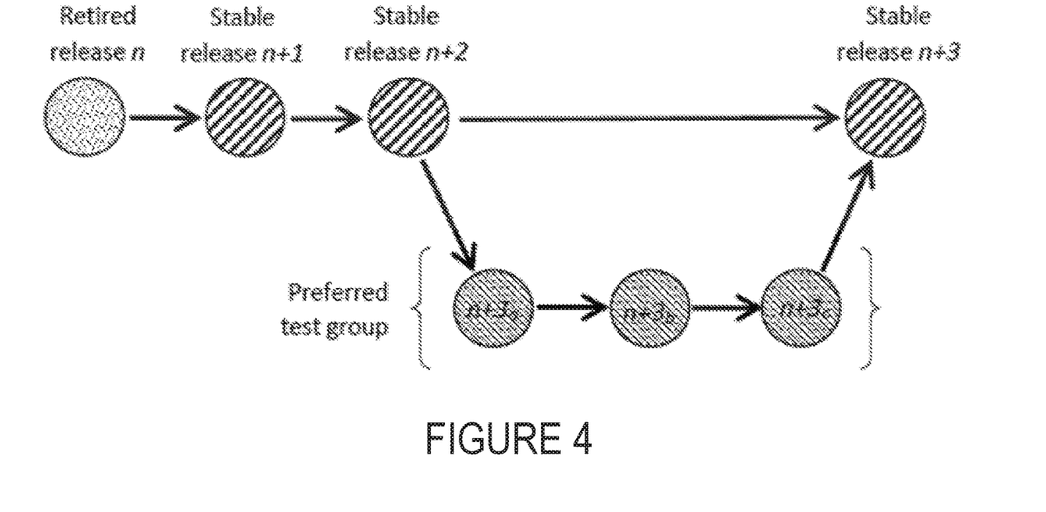
FIG. 4 schematically illustrates a second embodiment of the present invention, in which one or more beta test versions of software updates are distributed among a select group of users only.
Figure 5:
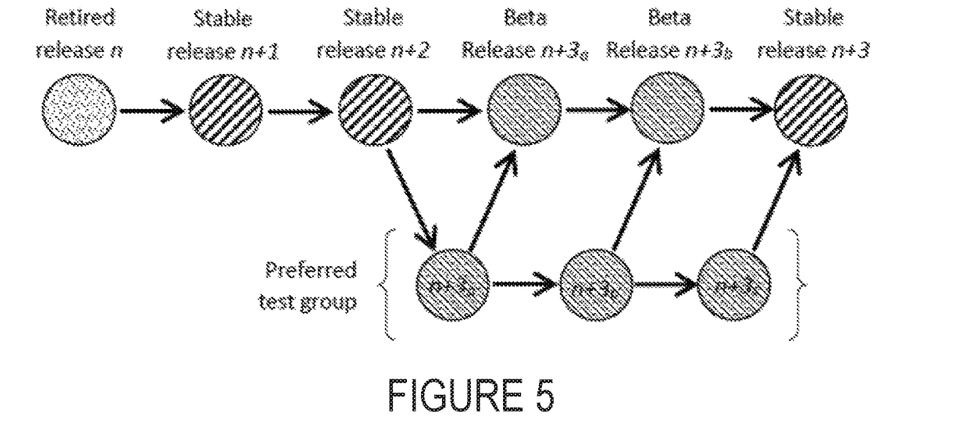
FIG. 5 schematically illustrates a third embodiment of the present invention, in which beta test versions of software updates are distributed to both general users, and a select group of users.
Figure 6:
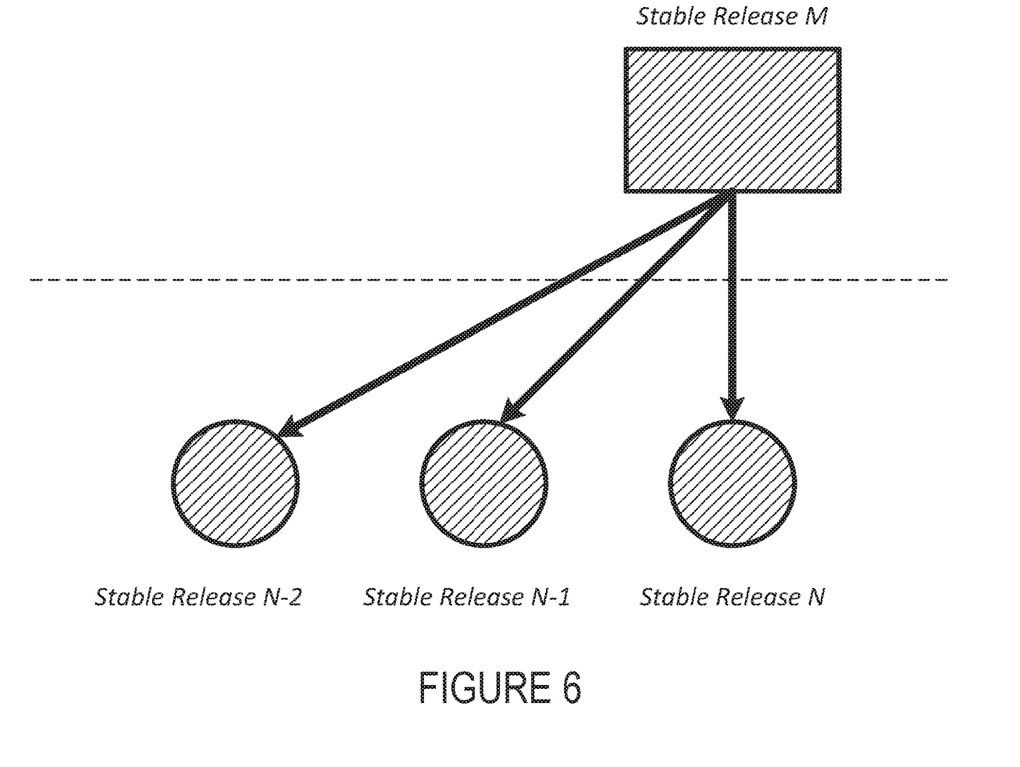
FIGS. 6-7 schematically illustrate a fourth embodiment of the present invention, in which the system and apparatus additionally or alternatively allows the apparatus operator to choose one of a plurality of stable versions of a first software component for carrying out the production of a particular three-dimensional object, each of which is configured to communicate with a single stable release version of a second software component.

"Stable release" as used herein refers to a process program or software version the functionality of which remains unchanging over time, though upgrades such as security patches and bug fixes to enhance reliability can be made. Stable releases have in the past been retired when the next stable release is made (see, e.g., FIG. 2), but in the present invention are made available to the end user concurrently with one or more subsequent stable release versions (see, e.g., FIGS. 3-7).

"Beta release" or "beta test" as used herein refers to a process program or software version that includes functionality changes, generally intended to improve functionality, which may be incorporated into a future stable release. Beta release versions are typically retired when the next stable release is made.

"Unique identifier" and "unique identifier reader" as used herein refer to components of an automatic identification and data capture system. Suitable unique identifiers include, but are not limited to, bar codes (including one-dimensional and two-dimensional bar codes (QR codes)), near field communication (NFC) tags, radio frequency identification (RFID) tags (including active, passive, and battery-assisted passive RFID tags), optical character recognition (OCR) tags and readers, magnetic strips and readers, etc. A variety of such systems are known and described in, for example, U.S. Pat. Nos. 8,120,468; 8,526,910; 9,373,201; 9,562,429; 9,576,476; 9,587,487; 9,589,428; and 9,595,058. Such unique identifiers can be mounted on a container for resins for distribution from a resin provider to an end user, as discussed further below.

As used herein, the term "and/or" includes any and all possible combinations of one or more of the associated listed items, as well as the lack of combinations when interpreted in the alternative ("or").

Materials (resins). Any material suitable for a particular process can be used to carry out the present invention, including but not limited to the resins described in U.S. Pat. Nos. 9,211,678; 9,205,601; and 9,216,546 to DeSimone et al. In some embodiments, dual cure resins are preferred. Such resins are known and described in, for example, U.S. Pat. Nos. 9,676,963, 9,453,142 and 9,598,606 to Rolland et al. Particular examples of suitable dual cure resins include, but are not limited to, Carbon Inc. medical polyurethane, elastomeric polyurethane, rigid polyurethane, flexible polyurethane, cyanate ester, epoxy, and silicone dual cure resins, all available from Carbon, Inc., 1089 Mills Way, Redwood City, California 94063 USA. Resins may be dispensed in any suitable manner, including as single component (1K) systems, or provided as two component (2K) systems that are mixed together when dispensed. blended upon dispensing as 2K systems. Dispensing may be manual or automated, and may employ a metering and dispensing device such as described in J. Rolland, C. Converse, O Nazarian, and M. Panzer, PCT Patent Application Publication No. WO 2018/237038 (published 27 Dec. 2018), the disclosure of which is incorporated herein by reference.

Apparatus. Suitable additive manufacturing apparatus include those configured for carrying out either bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP, or of additive manufacturing, include but are not limited to those described in B. Feller, US Patent App. Pub. No. US 2018/0243976 (published Aug. 30, 2018); M. Panzer and J. Tumbleston, US Patent App. Pub. No. US 2018/0126630 (published May 10, 2018); K. Willis and B. Adzima, US Patent App. Pub. No. US 2018/0290374 (Oct. 11, 2018); Batchelder et al., US Patent Appub. No. US 2017/0129169 (May 11, 2017); Sun and Lichkus, US Patent App. Pub. No. US 2016/0288376 (Oct. 6, 2016); Willis et al., US Patent App. Pub. No. US 2015/0360419 (Dec. 17, 2015); Lin et al., US Patent App. Pub. No. US 2015/0331402 (Nov. 19, 2015); and D. Castanon, US Patent App. Pub. No. US 2017/0129167 (May 11, 2017), the disclosures of which are incorporated by reference herein in their entirety.

The apparatus can include a local controller that contains and executes operating instructions (sometimes referred to as the "print planner") for the production of a three dimensional object on that apparatus, typically from an object data file entered into the controller by the user. Along with the basic three-dimensional image of the object that is typically projected for photopolymerization (along with movement of the carrier and build surface away from one another in the Z direction), the operating instructions can include or generate process parameters such as: light intensity; light exposure duration; inter-exposure duration; speed of production; step height; height and/or duration of upstroke in a stepped or reciprocal operating mode; height and/or duration of downstroke in a reciprocal operating mode; rotation speed for pumping viscous polymerizable liquid; resin heating temperature; and/or resin cooling temperature; rotation speed and frequency; volume or amount of polymerization inhibitor supplied to the build surface (e.g., oxygen flow or partial pressure of oxygen); etc. (see, e.g., Ermoshkin et al., *Three-dimensional printing with reciprocal feeding of polymerizable liquid* PCT Patent Application Pub. No. WO2015/195924 (published 23 Dec. 2015); Sutter et al., *Fabrication of three dimensional objects with multiple operating modes*, PCT Patent Application Publication No. WO2016/140886 (published 9 Sep. 2016); J. DeSimone et al., *Methods and apparatus for continuous liquid interface production with rotation*, PCT Patent Application WO2016/007495 (published 14 Jan. 2016); see also J. DeSimone et al., U.S. Pat. No. 9,211,678, and J. Batchelder et al., *Continuous liquid interface production system with viscosity pump*, U.S. Patent Application Publication No. U.S. 2017/0129169 (published 11 May 2017).

In one non-limiting embodiment, the apparatus may be a Carbon Inc., M1 or M2 additive manufacturing apparatus, available from Carbon, Inc., 1089 Mills Way, Redwood City, CA 94063 USA.

2. Build Plates and Window Cassettes.

While the present invention is in a preferred embodiment envisioned for apparatuses and/or systems comprising window cassettes used to carry out CLIP, it is applicable to any bottom-up stereolithography process for which a window may benefit from optical correction, whether that window is formed from a single layer of optically transparent material, or from multiple layers of optically transparent materials formed of different materials.

In some embodiments, a window cassette useful for removably mounting on a bottom-up stereolithography apparatus includes: (a) a circumferential frame; (b) an optically transparent member connected to the circumferential frame, the optically transparent member having a build surface on which an object can be produced, and with the optically transparent member having and at least one variable property therein; and (c) either a unique identifier (e.g., an NFC tag) or a data storage media (e.g., a flash memory) connected to the circumferential frame. The optically transparent member may include a plurality of distinct layers. In some embodiments, the optically transparent member comprises: (i) a rigid or flexible, semi-permeable or impermeable, support member; (ii) either a semipermeable member on the support member (e.g., a fluoropolymer member) or an immiscible layer (e.g., a hydrogel) on the support member; (iii) an inhibitor of polymerization (e.g., oxygen) in the semipermeable member when present; (iii) optionally but preferably, a cushioning member between the impermeable support member and the semipermeable member; and (v) optionally but preferably, feed space (e.g., feed channels) between the impermeable support member and the semipermeable member (e.g., in or on the cushioning member), the feed space configured for supplying additional inhibitor of polymerization (e.g., oxygen) into the semipermeable member.

Examples of windows that can be used to carry out the present invention include, but are not limited to, those described in: U.S. Pat. No. 9,498,920 to J. DeSimone, A. Ermoshkin, and E. Samulski; U.S. Pat. No. 9,360,757 to J. DeSimone, A. Ermoshkin, N. Ermoshkin and E. Samulski; and U.S. Pat. No. 9,205,601 to J. DeSimone, A. Ermoshkin, N. Ermoshkin and E. Samulski; U.S. Patent Application Publication Nos. 2016/0046075 to J. DeSimone, A. Ermoshkin et al.; US 2016/0193786 to D. Moore, A. Ermoshkin et al.; 2016/0200052 to D. Moore, J. Tumbleston et al.; and 2016/0288376 to Sun and Lichkus; PCT Patent Application Publication Nos. WO2016/123499 to D. Moore, J. Tumbleston et al; WO2016/123506 to D. Moore, J. Tumbleston et al.; WO2016/149097 to J. Tumbleston, E. Samulski et al.; WO2016/149014 to J. Tumbleston, E. Samulski et al.; WO2016/172783 to R. Fortier and D. Castanon; WO2016/172788 to R. Fortier and D. Castanon; WO2016/172804 to R. Fortier and D. Castanon; WO2016/172805 to R. Fortier and D. Castanon; WO2015/164234 to L. Robeson et al. (see also U.S. Pat. Nos. 10,259,171 and 10,434,706); WO 2017/210298 to C. Mirkin et al., (see also US Pat. App. US 2019/0160733); and others (the disclosures of all of which are incorporated by reference herein in their entirety).

Additional examples of process controllers, control programs, and process parameters that may be altered by the process controller in response to input as described above include those set forth in Sutter, Gutierrez, Shirvanyants, Moore, and Tumbleston, *Fabrication of three dimensional objects with multiple operating modes*, US Patent Application Pub. No. US2018/0022034 (Jan. 25, 2018), Goldman, Carlson, and Parmar, *Methods, systems, and computer program products for determining orientation and fabrication parameters used in three-dimensional* (3D) *continuous liquid interface printing* (CLIP) *systems, and related printers*, US Patent Application Pub. No. US 2016/0263838 (Sep. 15, 2016); Goldman, Carlson, and Parmar, *Methods, systems, and computer program products for determining fabrication parameters used in three-dimensional* (3D) *continuous liquid interface printing* (CLIP) *systems, and related printers*, US Patent Application Pub. No. US 2016/0263837 (Sep. 15, 2016); and Carlson and Parmar, *Remote three-dimensional continuous liquid interface production* (CLIP) *systems, related printers, and methods of operating the same* US Patent Application Pub. No. US 2016/0229123 (Aug. 11, 2016), the disclosures of which are incorporated by reference herein in their entirety.

Unique identifiers can be assigned to resins, objects, and window cassettes, and recorded to a database, by any suitable means, such as described in J. Desimone, R. Goldman, S. Pollack, and R. Liu, PCT Patent Application Publication No. WO2018/169826 (published 20 Sep. 2018) and J. Rolland, C. Converse, O Nazarian, and M. Panzer, PCT Patent Application Publication No. WO 2018/237038 (published 27 Dec. 2018), the disclosures of which are incorporated herein by reference.

3. Systems.

Figure 1:
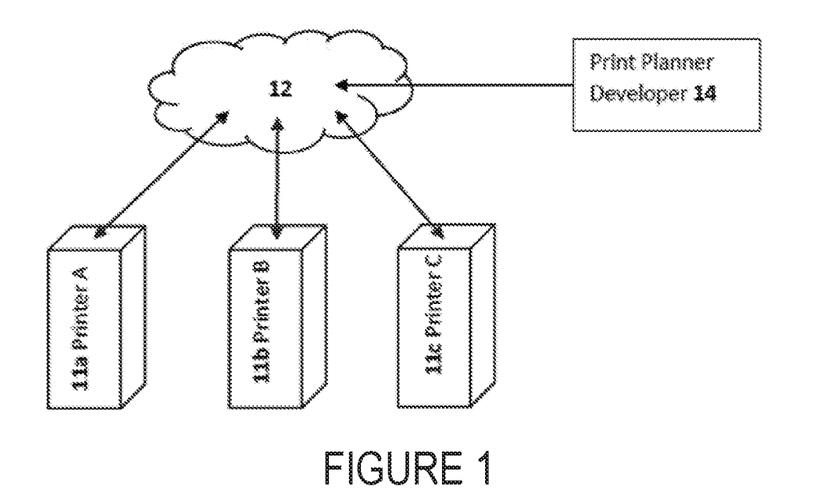
FIG. 1 schematically illustrates one embodiment of an additive manufacturing system, in which local process control is updated over the Internet.

Systems of the invention are schematically illustrated in FIGS. 1 and 2-6, where FIG. 1 shows a non-limiting example of a plurality of additive manufacturing apparatuses (11*a*, 11*b*, 11*c*), updatable over the Internet (12) from and by program developer (14).

Thus, the present invention provides, in some embodiments, an additive manufacturing system, including: (a) at least one additive manufacturing apparatus (e.g., a stereolithography apparatus) on which a process of producing a three-dimensional object from a material can be performed; (b) an additive manufacturing process controller operatively associated with each the at least one additive manufacturing apparatus; (c) a memory device operatively associated with the additive manufacturing process controller, wherein the memory device rises non-transitory instructions that are executable by the associated additive manufacturing process controller, the memory device comprising: (d1) a first stable release process program executable by the process controller; (d2) a second stable release process program executable by the process controller; and (d3) optionally, a third stable release process program executable by the process controller; the additive manufacturing system further comprising: (e) a selector operatively associated with the process controller, wherein the selector is configured to choose one of the first, second, or optional third stable release process programs to run on the process controller and produce a three-dimensional object on each at least one additive manufacturing apparatus.

In some embodiments, each of the first, second, and optional third stable release process programs is configured to generate a process of producing the three-dimensional object based on (i) a specific geometry of the three-dimensional object to be produced, (ii) specific characteristics of the material (e.g., stereolithography resin such as a dual cure resin) from which the three-dimensional object is to be produced, and, optionally but preferably, (iii) a specific structural configuration of the additive manufacturing apparatus on which the process is carried out.

In some embodiments, the additive manufacturing apparatus includes a removable (for example, interchangeable) window cassette, and each of the first, second, and optional third stable release process programs is configured to generate a process of producing a three-dimensional object based on a window cassette type of the removable window cassette and/or a specific window identity of the removable window cassettes (that is, where groups of window cassettes of the same structural configuration have been further characterized to identify unique distinguishing characteristics).

In some embodiments, each of the first, second, and optional third stable release process programs is configured to generate a process of producing a three-dimensional object based on current data on a status or performance of the additive manufacturing apparatus on which the process is carried out (e.g., age or current intensity of light source).

In some embodiments, the system further includes: (f) a comparator operatively associated with the process controller and configured to compare at least one performance characteristic (e.g., accuracy of production, speed of production, production yield) of the first, second, and optional third stable release process programs when each of the first, second, and optional third stable release process runs on the process controller for production of the same three-dimensional object.

In some embodiments, the selector is configured to choose one of the first, second, or optional third stable release process programs to run on the process controller based on a result of the comparator.

In some embodiments, the memory device including the first, second, and optional third stable release process programs is configured to communicate with the process controller via the Internet.

In some embodiments, the first, second, and optional third stable release process programs were received by the memory device via the Internet.

In some embodiments, the selector is configured to choose one of the first, second, or optional third stable release process programs to run on the process controller responsive to user input.

In some embodiments, the system further includes: a resin database on or available to the process controller, the database comprising material characteristic data (e.g., viscosity, photosensitivity, etc.) for different material batches, each different material batch assigned a unique identifier.

In some embodiments, each of the first, second, and optional third stable release process program each includes an input configured to acquire resin characteristic data based on a corresponding material batch unique identifier, and modify the process of producing the three-dimensional object on each the additive manufacturing apparatus based on the material characteristic data.

While the invention is described herein with reference to three stable release programs, still additional stable release programs can be included as desired. Also, beta test release programs can be provided, in any of a variety of ways. For example, beta tests can be provided to end users (see FIG. 3), with each beta test program typically being retired once the next beta test release, or next stable release, is provided. Alternatively, beta tests programs can be made available to only a select group or subset of users (see FIG. 4). And in still another version, beta test programs can be made available to both a select group of users and all users (see FIG. 5), though both groups need not be provided all versions of the beta test programs.

A further aspect of the invention is a memory device comprising non-transitory computer readable programs that are executable by a processing device and that cause the processing device to generate operating instructions for an additive manufacturing production process that produces a three-dimensional object, wherein the memory device includes: (a) a first stable release process program; (b) a second stable release process program; and (c) optionally, a third stable release process program, wherein each of the first, second, and optional third stable release process programs, when executed by the processing device, generate at least one different operating instruction that results in a different production characteristic (e.g., accuracy of production, speed of production, production yield) when the additive manufacturing production process that produces the three-dimensional object is performed.

In some embodiments, each of the first, second, and optional third stable release process programs is configured to generate operating instructions based on (i) a specific geometry of the three-dimensional object to be produced, (ii) specific characteristics of a material from which the three-dimensional object is to be produced, and, optionally but preferably, (iii) a specific structural configuration of an additive manufacturing apparatus on which the additive manufacturing production process is carried out.

In some embodiments, each of the first, second, and optional third stable release process programs is configured to generate operating instructions based on attributes of an additive manufacturing apparatus that produces the three-dimensional object (e.g., a window cassette type and/or specific window identity of a window of the additive manufacturing apparatus).

In some embodiments, each of the first, second, and optional third stable release process programs is configured to generate operating instructions based on current data on the status or performance of the additive manufacturing apparatus on which the process is carried out (e.g., age or current intensity of light source).

In some embodiments, the memory device is configured to transmit the first, second, or optional third stable release process program to the processing device via the Internet.

In some embodiments, each of the first, second, and optional third stable release process programs is configured to acquire material characteristic data based on a corresponding material batch unique identifier, and generate operating instructions based on the material characteristic data. The material characteristic data may describe at least one property of a material used in the additive manufacturing production process to produce the three-dimensional object.

In some embodiments, the material characteristic data is acquired from a material database, the material database comprising material characteristic data (e.g., viscosity, photosensitivity, etc.) for different material batches, each different material batch assigned a material batch unique identifier.

Figure 7:
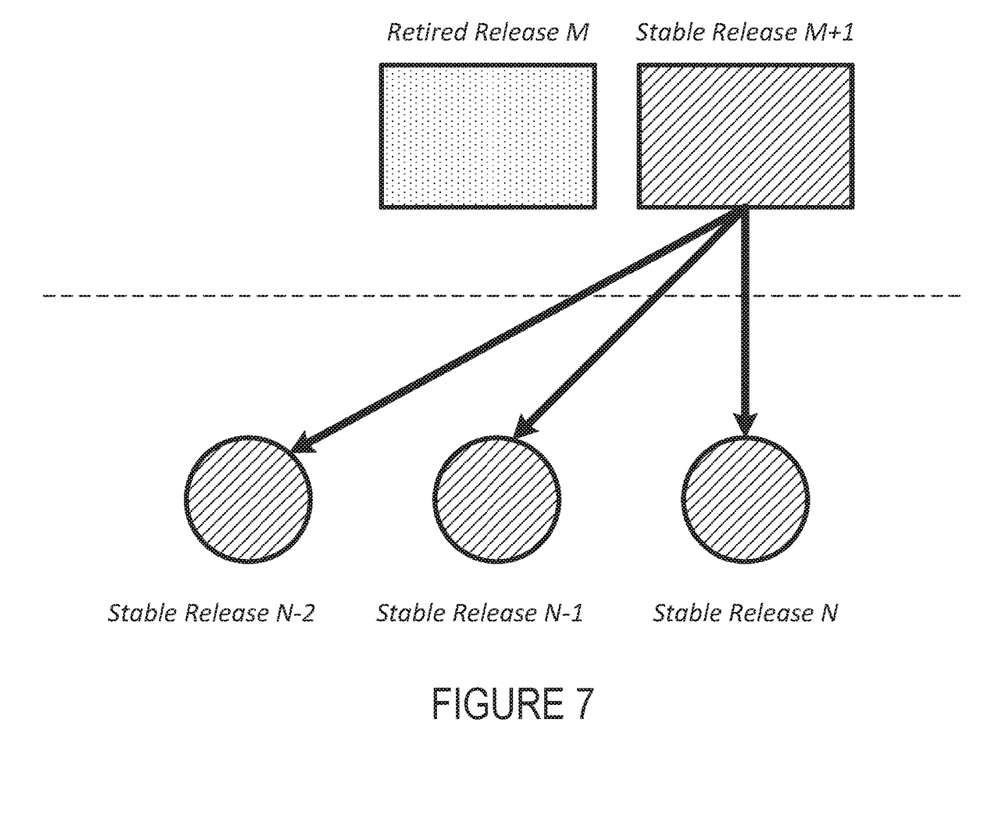

Additionally, in some embodiments (see FIGS. 6-7), a plurality of stable releases of a first software program or component may be provided, each of which is configured to communicate either bi-directionally or uni-directionally with a single stable release of a second software program or component. For example, in FIG. 6, three stable releases of the first software program or component (Stable Release N-2, Stable Release N-1, and Stable Release N) may be provided, and a single stable release of the second software program or component (Stable Release M) may be provided. In FIG. 7, three stable releases of the first software program or component (Stable Release N-2, Stable Release N-1, and Stable Release N) may be provided, and a single stable release of the second software program or component (Stable Release M+1) may be provided, and release M may be a retired release. The functionality of the first software program or component may change in time and/or between Release N, Stable Release N-1 and Stable Release N-2. The functionality of the second software program or component may change in time and/or between Release M and Release M+1.

In some embodiments, each stable release of the first software program may be configured to generate to perform a first subset of operations related to a print process for producing the three-dimensional object, such as generating instructions to be communicated to an additive manufacturing apparatus, with the instructions based on (i) a specific geometry of the three-dimensional object to be produced, (ii) specific characteristics of the material (e.g., stereolithography resin such as a dual cure resin) from which the three-dimensional object is to be produced, and, optionally but preferably, (iii) a specific structural configuration of the additive manufacturing apparatus on which the process is carried out. Other operations may be included in the first subset of operations.

In some embodiments, the single stable release of the second software program or component may be configured to perform a second subset of operations related to the print process for producing the three-dimensional object, such as performing a layout process for the three-dimensional object, performing an orientation process for the three-dimensional object, selecting an additive manufacturing apparatus from a plurality of additive manufacturing apparatuses for object production, providing a user interface to a user related to the print process for producing the three-dimensional object. Other operations may be included in the second subset of operations. In some embodiments, selection of one of the stable releases of the first software program or component may be performed via the second software program or component.

In some embodiments, changed functionality may be available in a stable release of the second software program or component that is incompatible with one or more of the stable releases of the first software program or component configured to communicate with the stable release of the second software program or component. Such changed functionality may be rendered inapplicable or inaccessible responsive to a selection of one or more of the stable releases of the first software program or component that is incompatible with the changed functionality of the second software program or component.

Thus, the present invention provides, in some embodiments, an additive manufacturing system. The additive manufacturing system may include (a) at least one additive manufacturing apparatus on which a process of producing a three-dimensional object from a material can be performed; (b) an additive manufacturing process controller operatively associated with each said at least one additive manufacturing apparatus; and (c) at least one first memory device operatively associated with the additive manufacturing process controller, with said at least one first memory device including non-transitory instructions that are executable by the associated additive manufacturing process controller. The at least one first memory device may include (d1) a first stable release process program comprising a first subset of operations and executable by said process controller; (d2) a second stable release process program comprising the first subset of operations and executable by said process controller; and (d3) optionally, a third stable release process program comprising the first subset of operations and executable by said process controller. The additive manufacturing system may further include (e) at least one second memory device operatively associated with the additive manufacturing process controller, with the memory device including non-transitory instructions that are executable by the associated additive manufacturing process controller and with the at least one second memory device including a fourth stable release process program comprising a second subset of operations and executable by said process controller, and (f) a selector operatively associated with said process controller. The selector may be configured to choose one of said first, second, or optional third stable release process programs comprising the first subset of operations to run on said process controller and produce a three-dimensional object on each at least one additive manufacturing apparatus.

In some embodiments, each of said first, second, and optional third stable release process programs may be configured to generate a process of producing the three-dimensional object based on (i) a specific geometry of said three-dimensional object to be produced, (ii) specific characteristics of the material from which said three-dimensional object is to be produced, and, optionally but preferably, (iii) a specific structural configuration of the additive manufacturing apparatus on which the process is carried out.

In some embodiments, said selector is configured to choose one of said first, second, or optional third stable release process programs to run on said process controller responsive to user input received by said fourth stable release process program.

In some embodiments, said at least one first memory device may comprise at least two first memory devices, and said first stable release process program may be stored on a different first memory device than said second stable release process program.

In some embodiments, said additive manufacturing apparatus may comprise a removable (for example, interchangeable) window cassette, and each of said first, second, and optional third stable release process programs may be configured to generate a process of producing a three-dimensional object based on a window cassette type of the removable window cassette and/or a specific window identity of the removable window cassettes (that is, where groups of window cassettes of the same structural configuration have been further characterized to identify unique distinguishing characteristics).

In some embodiments, each of said first, second, and optional third stable release process programs may be configured to generate a process of producing a three-dimensional object based on current data on a status or performance of the additive manufacturing apparatus on which the process is carried out (e.g., age or current intensity of light source).

In some embodiments, the system may further include (g) a comparator operatively associated with said process controller and configured to compare at least one performance characteristic (e.g., accuracy of production, speed of production, production yield) of said first, second, and optional third stable release process programs when each of said first, second, and optional third stable release process runs on said process controller for production of the same three-dimensional object.

In some embodiments, said selector may be configured to choose one of said first, second, or optional third stable release process programs to run on said process controller based on a result of said comparator.

In some embodiments, said at least one first memory device may be configured to communicate with said process controller via the Internet.

In some embodiments, said first, second, and optional third stable release process programs may be received by the at least one first memory device via the Internet.

In some embodiments, the system may further include a resin database on or available to said process controller, said database comprising material characteristic data (e.g., viscosity, photosensitivity, etc.) for different material batches, each different material batch assigned a unique identifier.

In some embodiments, each of said first, second, and optional third stable release process program may include an input configured to acquire resin characteristic data based on a corresponding material batch unique identifier, and may modify the process of producing the three-dimensional object on each said additive manufacturing apparatus based on said material characteristic data.

In some embodiments, said additive manufacturing apparatus may include a stereolithography apparatus.

In some embodiments, said material comprises a photopolymerizable resin (e.g., a dual cure resin, such as a polyurethane, epoxy, cyanate ester, or silicone dual cure resin).

Some aspects of the present invention provide a system comprising at least one first memory device and at least one second memory device. Said at least one first memory device stores non-transitory computer readable programs that are executable by a processing device and that cause the processing device to generate operating instructions for an additive manufacturing production process that produces a three-dimensional object, including (a) a first stable release process program comprising a first subset of operations; (b) a second stable release process program comprising the first subset of operations; and (c) optionally, a third stable release process program comprising the first subset of operations. Said at least one second memory device stores non-transitory computer readable programs that are executable by a processing device and that cause the processing device to generate operating instructions for an additive manufacturing production process that produces a three-dimensional object, including (d) a fourth stable release process program comprising a second subset of operations that is different from the first subset of operations. Each of the first, second, and optional third stable release process programs, when executed by the processing device, generate at least one different operating instruction that results in a different production characteristic (e.g., accuracy of production, speed of production, production yield) when the additive manufacturing production process that produces the three-dimensional object is performed, and the fourth stable release process program may be configured to select one of the first, second, and optional third stable release process programs.

In some embodiments, each of said first, second, and optional third stable release process programs may be configured to generate operating instructions based on (i) a specific geometry of the three-dimensional object to be produced, (ii) specific characteristics of a material from which said three-dimensional object is to be produced, and, optionally but preferably, (iii) a specific structural configuration of an additive manufacturing apparatus on which the additive manufacturing production process is carried out.

In some embodiments, each of said first, second, and optional third stable release process programs may be configured to generate operating instructions based on attributes of an additive manufacturing apparatus that produces the three-dimensional object (e.g., a window cassette type and/or specific window identity of a window of the additive manufacturing apparatus).

In some embodiments, each of said first, second, and optional third stable release process programs may be configured to generate operating instructions based on current data on the status or performance of the additive manufacturing apparatus on which the process is carried out (e.g., age or current intensity of light source).

In some embodiments, each of said first, second, and optional third stable release process programs may be configured to acquire material characteristic data based on a corresponding material batch unique identifier, and generate operating instructions based on said material characteristic data, where said material characteristic data describes at least one property of a material used in the additive manufacturing production process to produce the three-dimensional object.

In some embodiments, said material characteristic data may be acquired from a material database, said material database comprising material characteristic data (e.g., viscosity, photosensitivity, etc.) for different material batches, each different material batch assigned a material batch unique identifier.

In some embodiments, said material comprises a photopolymerizable resin (e.g., a dual cure resin, such as a polyurethane, epoxy, cyanate ester, or silicone dual cure resin).

4. Alternate Processes and Apparatus.

While the present invention is described primarily with respect to stereolithography methods and apparatus (SLA, including the methods and apparatus sometimes referred to as digital light processing (DLP)), it can also be applied to other types of additive manufacturing, including but not limited to those sometimes described as selective laser sintering (SLS), fused deposition modeling (FDM), selective laser melting (SLM), electron beam melting (EBM), laminated object manufacturing (LOM), binder jetting (BJ), and material jetting (MJ).

The foregoing is illustrative of the present invention, and is not to be construed as limiting thereof. The invention is defined by the following claims, with equivalents of the claims to be included therein.

We claim:
1. An additive manufacturing system, comprising:
(a) at least one additive manufacturing apparatus on which a process of producing a three-dimensional object from a material can be performed;
(b) an additive manufacturing process controller operatively associated with each said at least one additive manufacturing apparatus;
(c) at least one first memory device operatively associated with the additive manufacturing process controller, wherein said at least one first memory device comprises non-transitory instructions that are executable by the associated additive manufacturing process controller, said at least one first memory device comprising:
(d1) a first stable release process program comprising a first subset of operations and executable by said additive manufacturing process controller;
(d2) a second stable release process program comprising the first subset of operations and executable by said additive manufacturing process controller; and
(d3) a third stable release process program comprising the first subset of operations and executable by said additive manufacturing process controller; the additive manufacturing system further comprising:
(e) at least one second memory device operatively associated with the additive manufacturing process controller, wherein the at least one second memory device comprises non-transitory instructions that are executable by the associated additive manufacturing process controller, said at least one second memory device comprising a fourth stable release process program comprising a second subset of operations and executable by said additive manufacturing process controller, and
(f) a selector operatively associated with said additive manufacturing process controller, wherein the selector is configured to choose one of said first, second, or third stable release process programs comprising the first subset of operations to run on said additive manufacturing process controller and produce the three-dimensional object on each at least one additive manufacturing apparatus.

2. The additive manufacturing system of claim 1, wherein each of said first, second, and third stable release process programs is configured to generate a process of producing the three-dimensional object based on (i) a specific geometry of said three-dimensional object to be produced, (ii) specific characteristics of the material from which said three-dimensional object is to be produced, and (iii) a specific structural configuration of the additive manufacturing apparatus on which the process is carried out.

3. The additive manufacturing system of claim 1, wherein said selector is configured to choose one of said first, second, or third stable release process programs to run on said additive manufacturing process controller responsive to user input received by said fourth stable release process program.

4. The additive manufacturing system of claim 1, wherein said at least one first memory device comprises at least two first memory devices, and wherein said first stable release process program is stored on a different first memory device than said second stable release process program.

5. The additive manufacturing system of claim 1, wherein said additive manufacturing apparatus comprises a removable window cassette, and each of said first, second, and third stable release process programs is configured to generate a process of producing the three-dimensional object based on a window cassette type of the removable window cassette and/or a specific window identity of the removable window cassettes.

6. The additive manufacturing system of claim 1, wherein each of said first, second, and third stable release process programs is configured to generate a process of producing a three-dimensional object based on current data on a status or performance of the additive manufacturing apparatus on which the process is carried out.

7. The additive manufacturing system of claim 1, further comprising:
(g) a comparator operatively associated with said additive manufacturing process controller and configured to compare at least one performance characteristic of said first, second, and third stable release process programs when each of said first, second, and third stable release process runs on said additive manufacturing process controller for production of the same three-dimensional object.

8. The additive manufacturing system of claim 7, wherein said selector is configured to choose one of said first, second, or third stable release process programs to run on said additive manufacturing process controller based on a result of said comparator.

9. The additive manufacturing system of claim 1, wherein said at least one first memory device is configured to communicate with said additive manufacturing process controller via the Internet.

10. The additive manufacturing system of claim 1, wherein said first, second, and third stable release process programs were received by the at least one first memory device via the Internet.

11. The additive manufacturing system of claim 1, further comprising:
a resin database on or available to said additive manufacturing process controller, said resin database comprising material characteristic data for different material batches, each different material batch assigned a unique identifier.

12. The additive manufacturing system of claim 11, wherein each said first, second, and third stable release process program each includes an input configured to acquire resin characteristic data based on a corresponding material batch unique identifier, and modify the process of producing the three-dimensional object on each said additive manufacturing apparatus based on said material characteristic data.

13. The additive manufacturing system of claim 1, wherein each said additive manufacturing apparatus comprises a stereolithography apparatus.

14. The additive manufacturing system of claim 1, wherein said material comprises a photopolymerizable resin.

15. A system comprising at least one first memory device and at least one second memory device, wherein said at least one first memory device stores non-transitory computer readable programs that are executable by a processing device and that cause the processing device to generate operating instructions for an additive manufacturing production process that produces a three-dimensional object, wherein the at least one first memory device comprises:
(a) a first stable release process program comprising a first subset of operations;
(b) a second stable release process program comprising the first subset of operations; and
(c) a third stable release process program comprising the first subset of operations, wherein said at least one second memory device stores non-transitory computer readable programs that are executable by a processing device and that cause the processing device to generate operating instructions for the additive manufacturing production process that produces the three-dimensional object, wherein the at least one second memory device comprises:

(d) a fourth stable release process program comprising a second subset of operations that is different from the first subset of operations;

wherein each of the first, second, and third stable release process programs, when executed by the processing device, generate at least one different operating instruction that results in a different production characteristic when the additive manufacturing production process that produces the three-dimensional object is performed, and wherein the fourth stable release process program is configured to select one of the first, second, and third stable release process programs.

16. The system of claim 15, wherein each of said first, second, and third stable release process programs is configured to generate operating instructions based on (i) a specific geometry of the three-dimensional object to be produced, (ii) specific characteristics of a material from which said three-dimensional object is to be produced, and (iii) a specific structural configuration of an additive manufacturing apparatus on which the additive manufacturing production process is carried out.

17. The system of claim 15, wherein each of said first, second, and third stable release process programs is configured to generate operating instructions based on attributes of an additive manufacturing apparatus that produces the three-dimensional object.

18. The system of claim 15, wherein each of said first, second, and third stable release process programs is configured to generate operating instructions based on current data on the status or performance of the additive manufacturing apparatus on which the process is carried out.

19. The system of claim 15, wherein each of said first, second, and third stable release process programs is configured to acquire material characteristic data based on a corresponding material batch unique identifier, and generate operating instructions based on said material characteristic data, wherein said material characteristic data describes at least one property of a material used in the additive manufacturing production process to produce the three-dimensional object.

20. The system of claim 19, wherein said material characteristic data is acquired from a material database, said material database comprising material characteristic data for different material batches, each different material batch assigned a material batch unique identifier, and wherein said material comprises a photopolymerizable resin.

* * * * *

UNITED STATES PATENT AND TRADEMARK OFFICE
CERTIFICATE OF CORRECTION

PATENT NO. : 11,982,991 B2  
APPLICATION NO. : 17/421199  
DATED : May 14, 2024  
INVENTOR(S) : Tumbleston et al.

Page 1 of 1

It is certified that error appears in the above-identified patent and that said Letters Patent is hereby corrected as shown below:

In the Specification

Column 2, Line 25: Please correct "produce." to read --produced.--

Column 4, Line 52: Please correct "Appub." to read --App. Pub.--

Column 5, Line 55: Please correct "(iii)" to read --(iv)--

Signed and Sealed this  
Twenty-seventh Day of August, 2024

Katherine Kelly Vidal  
*Director of the United States Patent and Trademark Office*